United States Patent
Drader et al.

(10) Patent No.: US 7,391,164 B2
(45) Date of Patent: Jun. 24, 2008

(54) VISUAL NOTIFICATION METHODS FOR CANDY-BAR TYPE CELLPHONES

(75) Inventors: Marc Drader, Kitchener (CA); James Robinson, Elmira (CA); Robert Lowles, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 203 days.

(21) Appl. No.: 10/940,977

(22) Filed: Sep. 15, 2004

(65) Prior Publication Data

US 2006/0055658 A1    Mar. 16, 2006

(51) Int. Cl.
*H05B 41/16* (2006.01)
*G08B 5/00* (2006.01)

(52) U.S. Cl. .................. 315/246; 315/129; 340/815.4; 345/102

(58) Field of Classification Search ... 315/169.1–169.3, 315/246, 129; 345/75.1, 102, 211; 340/815.4, 340/815.45, 815.65, 815.66; 116/200, 202, 116/205; 379/144.08, 376.01
See application file for complete search history.

(56) References Cited

U.S. PATENT DOCUMENTS

| | | | | |
|---|---|---|---|---|
| 5,410,141 A | * | 4/1995 | Koenck et al. | 235/472.02 |
| 5,659,299 A | * | 8/1997 | Williamson et al. | 340/825.57 |
| 5,949,346 A | * | 9/1999 | Suzuki et al. | 340/815.45 |
| 6,278,887 B1 | | 8/2001 | Son et al. | 455/566 |
| 6,438,390 B1 | * | 8/2002 | Awan | 455/566 |
| 7,117,019 B2 | * | 10/2006 | Abbasi | 455/566 |
| 7,221,964 B2 | * | 5/2007 | Brubacher-Cressman et al. | 455/566 |
| 2001/0024967 A1 | | 9/2001 | Bauer | 455/574 |
| 2001/0035853 A1 | * | 11/2001 | Hoelen et al. | 345/102 |
| 2002/0070682 A1 | * | 6/2002 | Atagi | 315/246 |
| 2002/0113761 A1 | | 8/2002 | Mizutani et al. | |
| 2004/0027364 A1 | | 2/2004 | Ohtani et al. | 345/699 |
| 2004/0041766 A1 | * | 3/2004 | Nakao et al. | 345/89 |
| 2004/0225904 A1 | * | 11/2004 | Perez et al. | 713/320 |
| 2004/0252030 A1 | * | 12/2004 | Trimble et al. | 340/825.36 |
| 2005/0087603 A1 | * | 4/2005 | Koenck et al. | 235/472.02 |
| 2005/0270265 A1 | * | 12/2005 | Plut | 345/102 |
| 2005/0285549 A1 | * | 12/2005 | Moon | 315/312 |
| 2006/0001660 A1 | * | 1/2006 | Plut | 345/211 |
| 2006/0007069 A1 | * | 1/2006 | Isono et al. | 345/75.1 |

FOREIGN PATENT DOCUMENTS

| EP | 1 056 261 A2 | 11/2000 |
|---|---|---|
| EP | 1 170 930 A1 | 1/2002 |

* cited by examiner

*Primary Examiner*—Thuy V. Tran
*Assistant Examiner*—Tung X Le
(74) *Attorney, Agent, or Firm*—McCarthy Tétrault LLP

(57) ABSTRACT

A wireless handheld communications device with a liquid crystal display, especially, a field sequential liquid crystal display, includes a visual notification for a powered up, inactive state. The visual notification is preferably through a light emitting diode that may be part of the backlighting system for the LCD or may be independent from the backlighting system. The waveforms, periodicity, colour selection, and colour sequencing may be customizable by one or both of the manufacturer and user.

20 Claims, 10 Drawing Sheets

VISUAL NOTIFICATION METHODS FOR CANDY-BAR TYPE CELLPHONES

FIELD OF THE INVENTION

The present invention relates to the field of wireless communications devices and, particularly, to visual notification methods for wireless communications devices.

BACKGROUND OF THE INVENTION

Wireless devices often use transmissive liquid crystal displays (LCDs). The transmissive LCDs are illuminated by a light source that usually is located behind the LCD with respect to a user viewing the display. Powering the LCD and the light source is a power source, usually a battery. The battery life is most impacted when the LCD is ON. The display must be turned off when the wireless device is not being used so as to conserve battery life. Often, especially when a wireless device has been powered on and then unused for an extended period of time, the wireless device may appear to have been powered down while wasting battery power. Thus, there is a need to provide notification to a user of the wireless device that power is on.

SUMMARY OF THE INVENTION

This invention addresses the problem of notifying a user of a powered up wireless device without rapidly reducing battery power. The method also offers a customizable colour inactivity notification system. Inactivity notification may be provided through a light source dedicated to notification or a light source that illuminates the display that may also be used for notifications. The light source is preferably one or more light emitting diodes.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Embodiments of present invention will now be described by way of example with reference to attached figures, wherein.

DETAILED DESCRIPTION

The present invention relates to a method and device, especially a mobile station such as a handheld communications device, that practices the method for providing notification for a powered on, inactive device. Preferably, the display is a liquid crystal display (especially, a field sequential LCD-FS LCD) and the light source includes light emitting diodes (LEDs) of different colours. The liquid crystal display may be operated at a rate of 30 or more frames per second in which light of successive colours flash or pulse once per frame. The LEDs of the light source preferably will include red, green, and blue colours. Other colour schemes, such as cyan, magenta, and yellow, are contemplated by the present invention. Although the present invention is directed to a liquid crystal display per se, the preferred use of the LCD is in a mobile station. Optionally, a light sensor may be used to vary the brightness of a notification so as to optimize power consumption.

Figure 1:
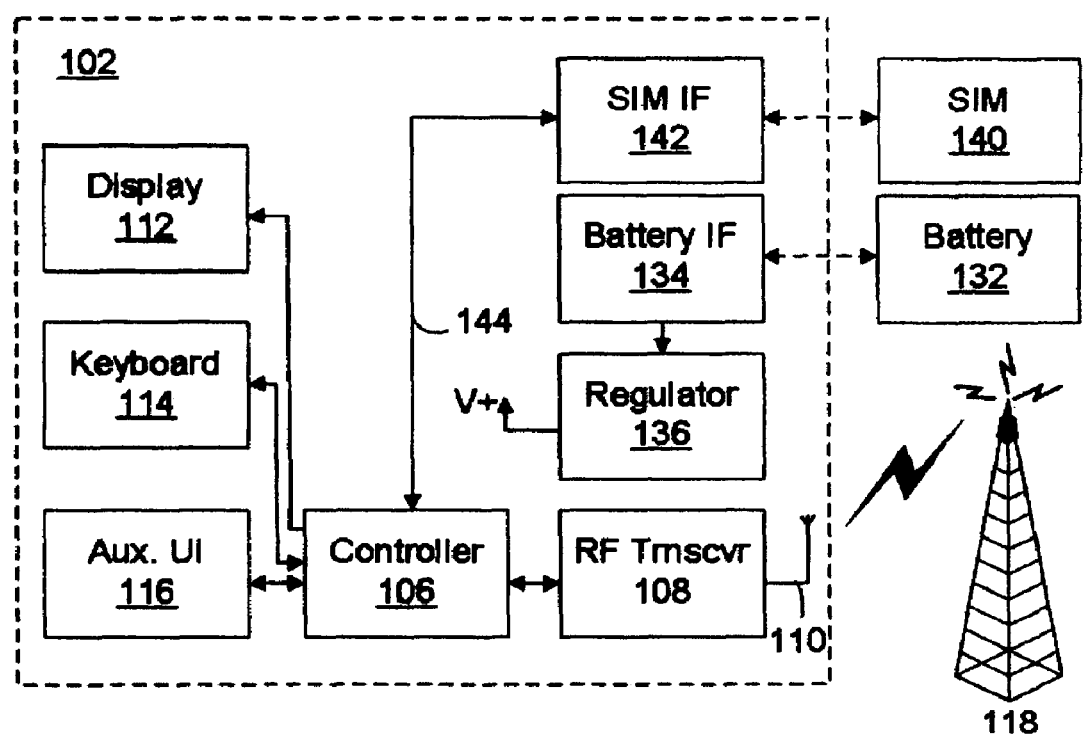
FIG. 1 is a block diagram that illustrates pertinent components of a wireless communications device that communicates within a wireless communication network according to the present invention.

FIG. 1 is a block diagram of a communication system 100 that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC) (not shown), including, for example, modulation/demodulation and, possibly, encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
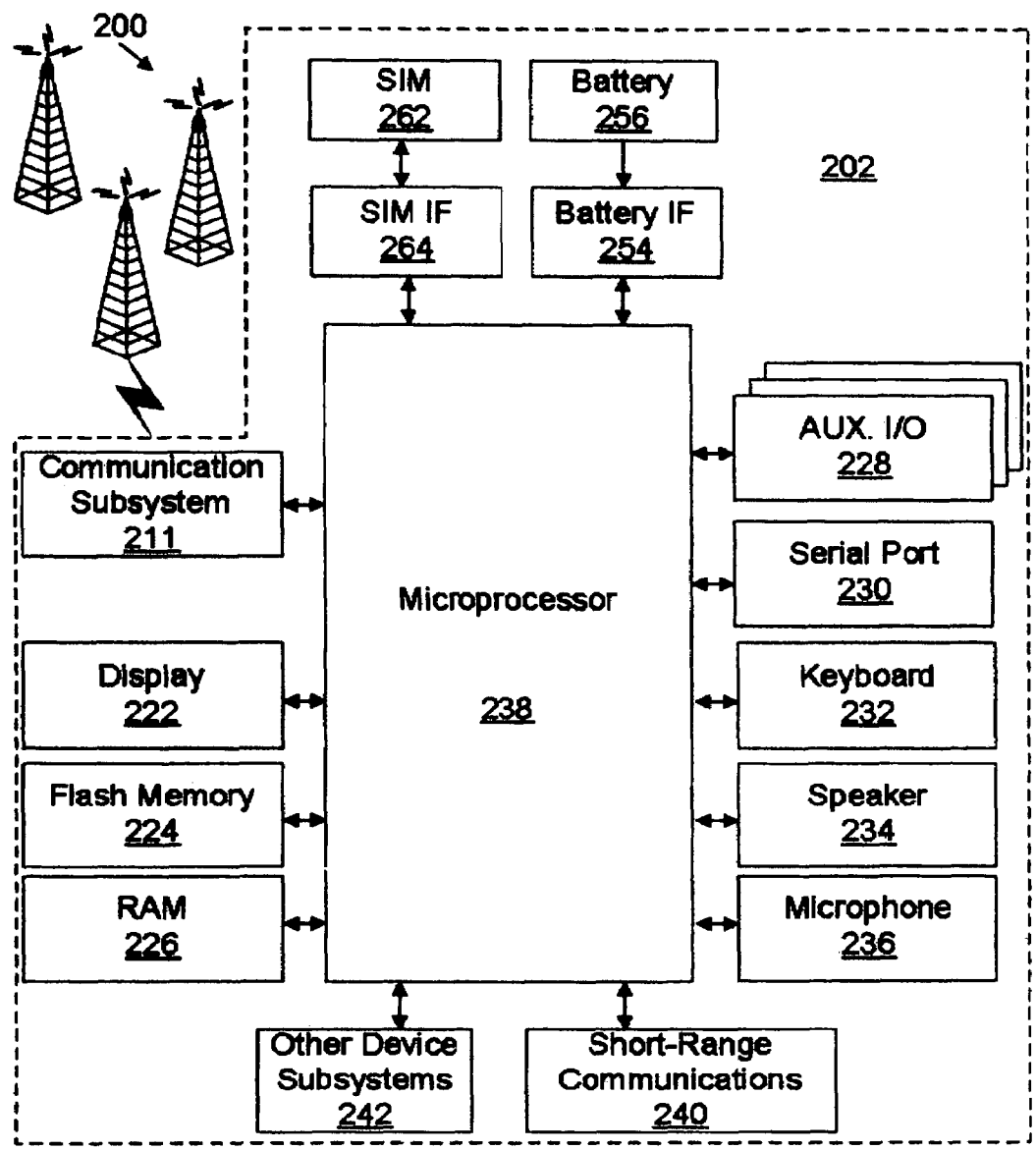
FIG. 2 is a more detailed diagram of a preferred wireless communications device of FIG. 1 according to the present invention.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most, if not all, electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a processor 238 (which is one implementation of controller 106 of FIG. 1) which controls overall operation of mobile station 202. Communication functions, including at least data and voice communications, are performed through communication subsystem 211. Processor 238 may be a microprocessor integrated circuit, a processing core in an area of an integrated circuit, or the like. Processor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by processor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Processor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by processor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to processor 238. Processor 238 will preferably further process the signal for output to display 222, to auxiliary I/O device 228 or both as described further herein below with reference to FIGS. 3 and 4. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is a multi-tasking handheld wireless communications device configured for sending and receiving data items and for making and receiving voice calls. To provide a user-friendly environment to control the operation of mobile station 202, an operating system resident on station 202 (not shown) provides a GUI having a main screen and a plurality of sub-screens navigable from the main screen.

Figure 3:
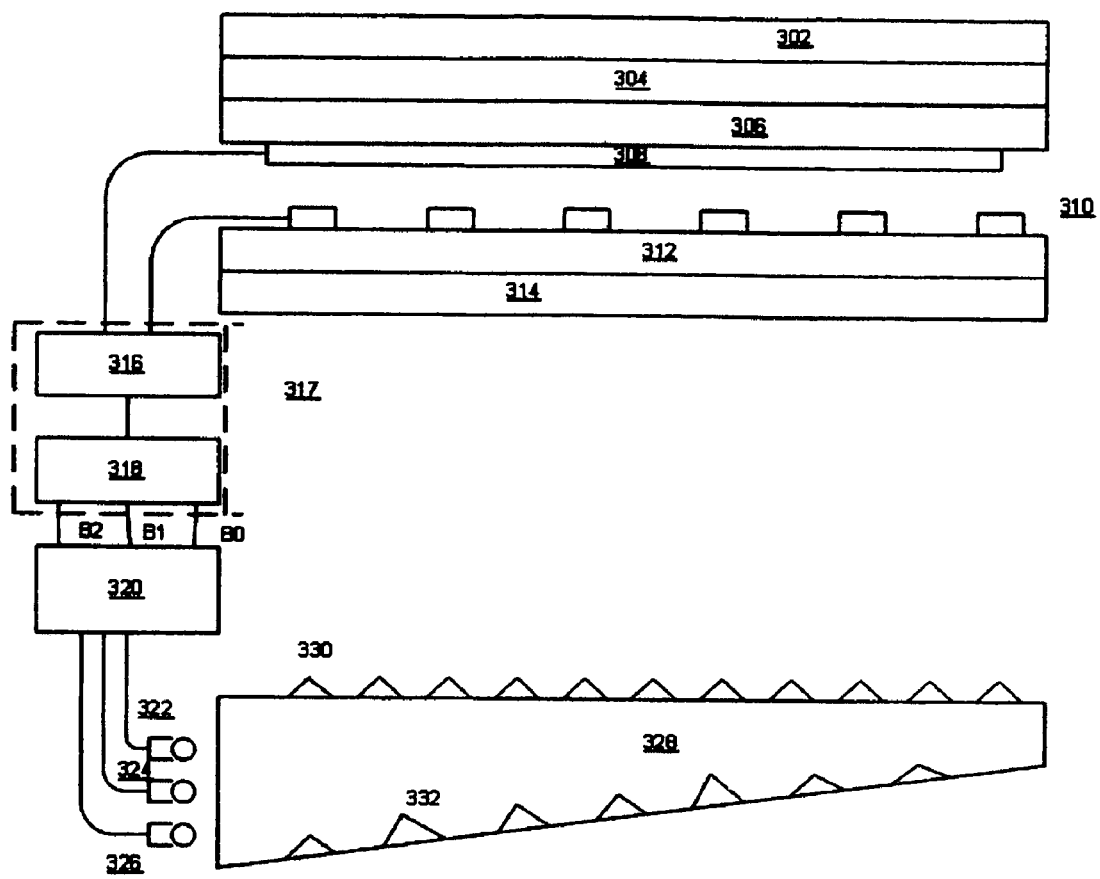
FIG. 3 illustrates an embodiment of a backlit liquid crystal display of the present invention.

The liquid crystal display cell 222 is shown in greater detail in FIG. 3 in which a light source formed from multiple LEDs 322, 324, 326 is used as a backlight. LCD controller 316 provides a voltage to the common electrode(s) 308 and the active elements 310 of the active matrix. The active elements are preferably thin film transistors. The common electrode(s) 308 and active elements are supported on substrates 306 and 312, respectively. The LCD preferably contains a brightness enhancing film or layer 304 to optimize the distribution of light for a viewer. As the preferred liquid crystal material is super twisted nematic, polarizers 302 and 314 are used. The LCD controller 316 sets the pixel grey scale of the LCD. An optional processor 318 may coordinate synchronization of the LCD controller 316 with the light source controller 320. Preferably, the LCD controller 316 and the processor 318 are integrated into a single device 317, which may simply be referred to as an LCD controller having the capability of controlling a light source controller 320. The light source may be implemented by using red, green, and blue LEDs 322, 324, 326. In a specific embodiment, four green, four red, and two blue LEDs are used to provide full colour and/or black and white display. Other colour combinations are contemplated. The LED controller 320 may sequence the three colours or may simultaneously energized LEDs of all of the colours and terminate power to the LEDs simultaneously. Other combinations of LEDs are contemplated. The light guide 328 may have a tapered block construction and may have approximately a trapezoidal form to more evenly distribute the light into the LCD. The light guide may also have uneven areas 330, 332 that scatter the light so as to avoid shadowing effects in the LCD image. Although uneven area 330 is shown to project out from the surface of the light guide 328 and uneven area 332 is shown to project inward to the surface of the light guide 328, the uneven areas may be arranged differently so long as the arrangement effectively scatters the light from the LEDs 322, 324, 326. The uneven areas may be abraded, molded, corrugated, chemically etched, or the like. Preferably, to maximize the utilization of light, the LEDs 322, 324, 326 and the light guide 328 are partially enclosed by a reflector such that the only opening is fully bounded by the light transmissive area of the LCD.

Figure 4:
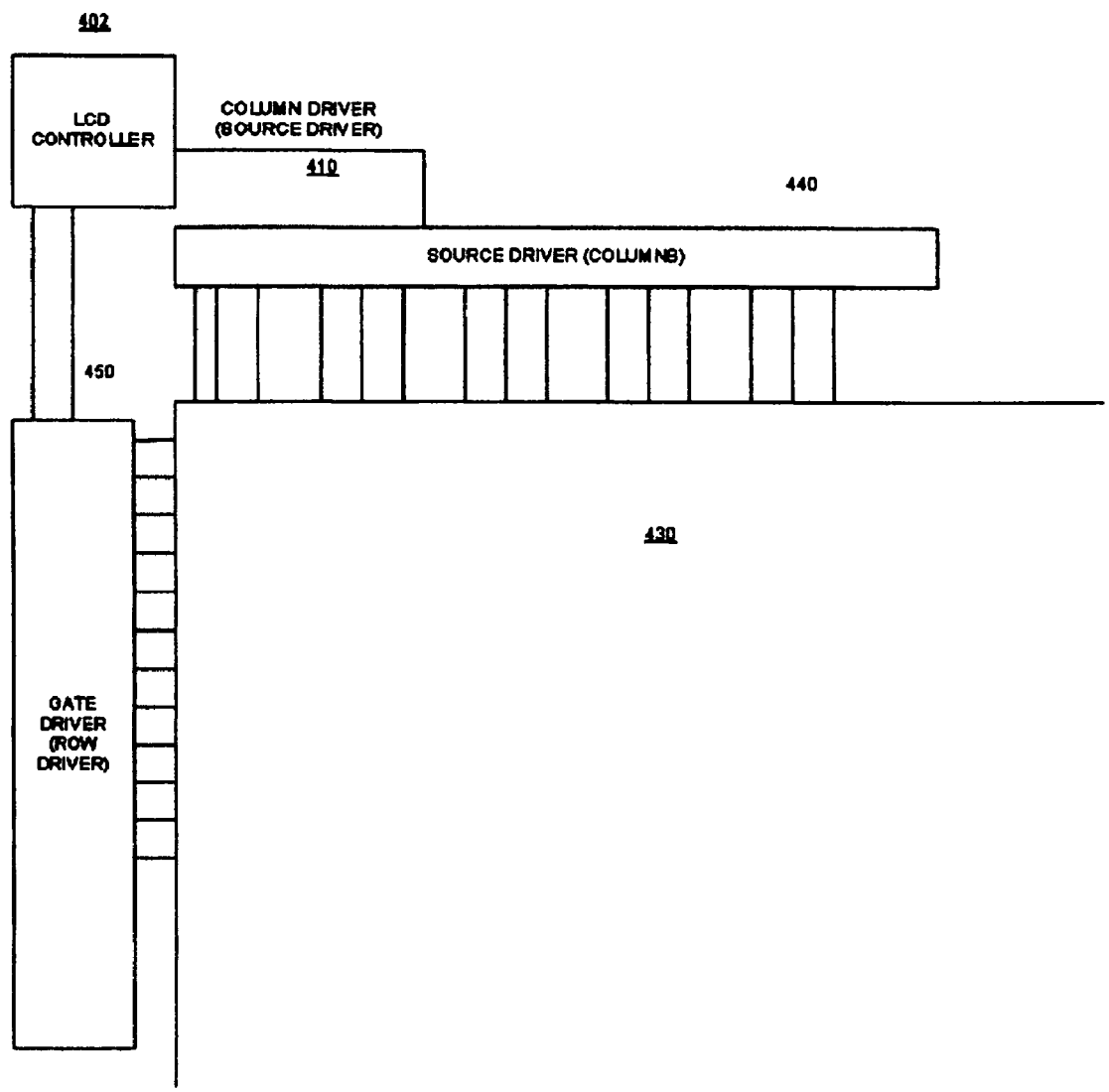
FIG. 4 illustrates an embodiment of the liquid crystal display and liquid crystal display controller of the present invention.

FIG. 4 illustrates an embodiment of the LCD controller 402 and LCD 430 for the method. The LED controller may be internally adapted to provide a sequence of lights each centered on a specific wavelength according to the LEDs energized, followed by light generated simultaneously from all LEDs or at least two LEDs generating light centered on two or more different wavelengths. In FIG. 4, in synchronization with the LED controller, the LCD controller 402 creates a grey scale pattern for each light centred on a specific wavelength according to column driver 440 (source driver) according to data and control signals 410 and row selectors 450 (gate driver) from a data bit line and a LOAD LINE clock in a X-Y matrix arrangement. For a red light pattern, only pixels selectable by the column driver 440 may be set to a transmissive state to provide a desired pattern. Pixels that do not have a red component of light are turned off. For green and blue light patterns, similar procedures are followed. When all red, green, and blue colours are transmitted through a given pixel, that pixel may have a white or whitish appearance because of the blending of the three primary colours perceived by a viewer. Advantages in using the light source to determine colours include elimination of a colour filter layer, thus enhancing brightness of the display by removing a light absorbing layer, and increasing the resolution as only one pixel is needed to provide full colour instead of separate red, green, and blue pixels. The size of a pixel is allowed to increase while resolution is improved; in other words, using the light source and not the LCD to determine colour optimizes LCD substrate real estate usage by increasing pixel size and improving the aperture ratio of a pixel.

Figure 5:
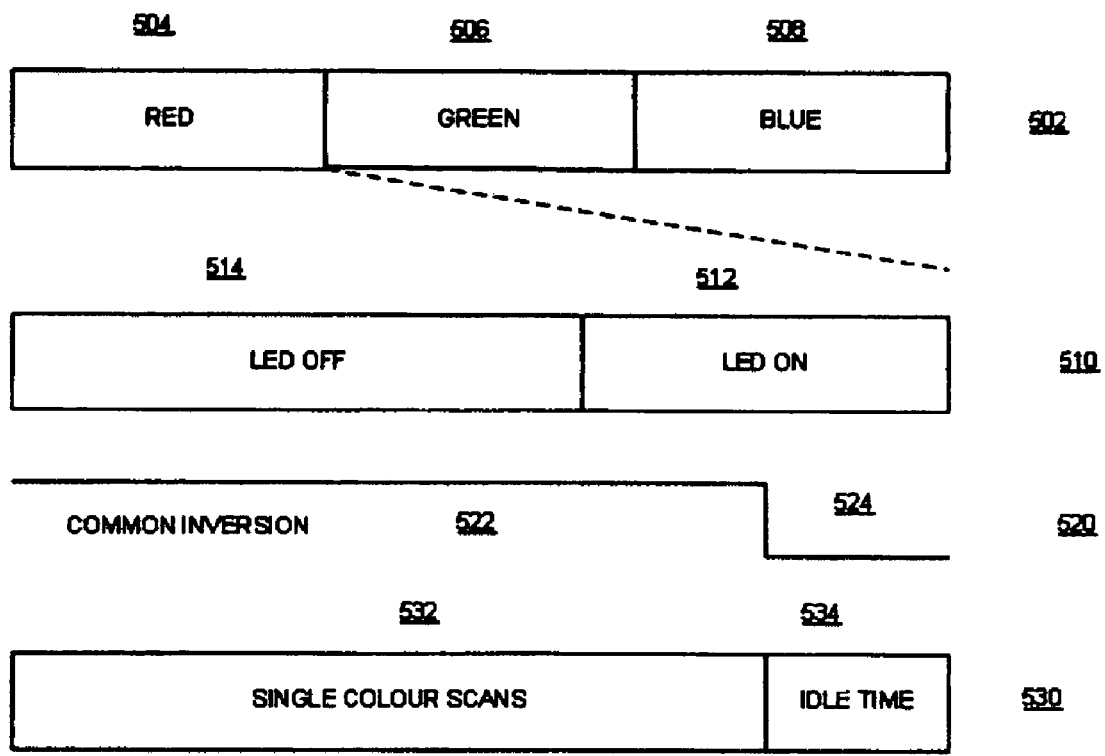
FIG. 5 illustrates a timing scheme for the light source and the display scans.

FIG. 5 illustrates a colour only mode in which either the entire display screen is in colour or the non-colour portion of the display screen is in the off state. In operation, pixel grey scale is achieved through pulses written to a pixel during scanning. Each colour frame 502 is divided into three parts (or fields) 504, 506, 508 for the three colours in full colour mode. Each pixel to be illuminated by a specific colour of light achieves a grey scale value from a pulse pattern into the source of the thin film transistor providing charge to the pixel. The pulse pattern (i.e., colour scans) includes multiple high and/or low pulses for each pixel. One pulse is applied to each colour pixel during a scan of the colour region that includes the colour pixel. During the colour region scan (or sweep) 532, the actual scanning occupies most of the time allotted 530 for a given colour. It is the successive scans of the colour pixels (e.g., red, then green, then blue) during a frame that establishes a full colour grey scale value. A smaller portion of the time allotted in a scan period is idle time 534. During most of the scan period, the light source is turned off 514. In alternative embodiments, the light source may remain on for most or all of the scan period and/or the actual scanning may occupy a different portion of the time allotted for a given colour. Once the final grey scale value for a row or line of pixels is fairly well established, the light source (e.g., light emitting diode) is turned on 512. In some embodiments, during the light source turn on time, the common electrode of the display is inverted from a first voltage bias level 522 to a second voltage bias level 524 to prevent charge buildup in the liquid crystal that would degrade performance and damage the display. The inversion of the common electrode voltage occurs for each colour for each frame. Thus, for a red, green, and blue pixel LCD, the common electrode voltage is inverted three times. Other inversion modes are contemplated such as line inversion and pixel inversion. In line inversion, a given line may be alternately supplied through the source driver with voltages from a first set of a polarity and then supplied with voltages from a second set of a polarity opposite to that of the first set; that is, a non-inverting pair of voltages may be applied and an inverting pair of voltages may later be applied. In pixel inversion, alternate columns may be supplied for each row with voltage sets of opposing polarities.

Figure 6:
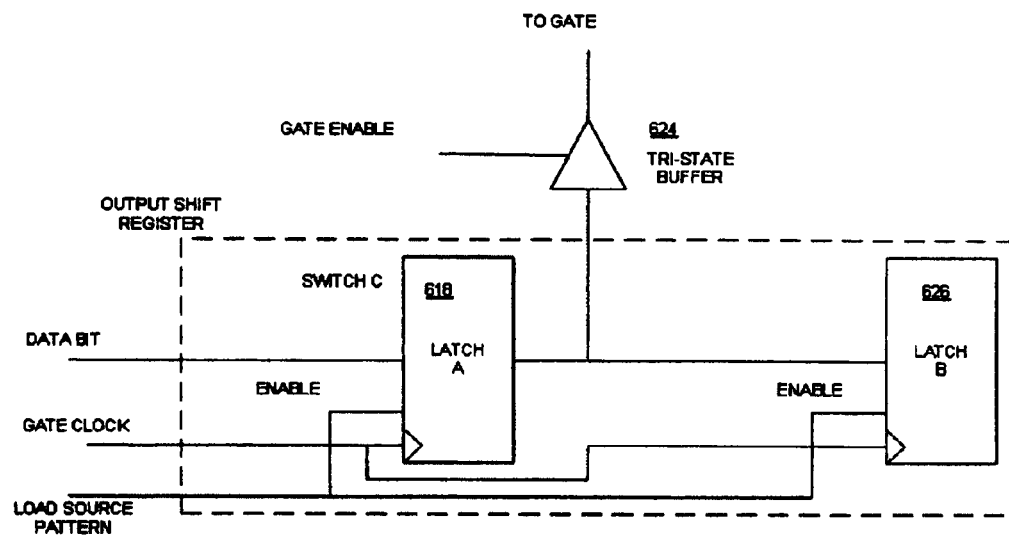
FIG. 6 illustrates an embodiment of a section of the gate line driver.
Figure 6:
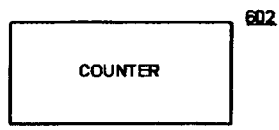

FIG. 6 represents a more specific embodiment. An output shift register (e.g., serial in/parallel out shift register) may be used for scanning the display screen. The shift register contains initialization values for the gate shift register. It preferably contains a one-hot encoding of the starting line number of display screen. (As used in an embodiment, one-hot encoding refers to a single active bit that is shifted through the shift register such that only one line at a time of pixels is written to and read from the source driver.) The shift register is loaded and then used to sweep the display. A LINE CLOCK rate is relatively high; for example, a 10 MHz clock rate may be used. The storage elements may be latches 618, 626 that latch data on the rising or falling edges of a clock, D type flip flops, or the like. A counter 602 may be used to hold the number of lines in the display screen.

Figure 7:
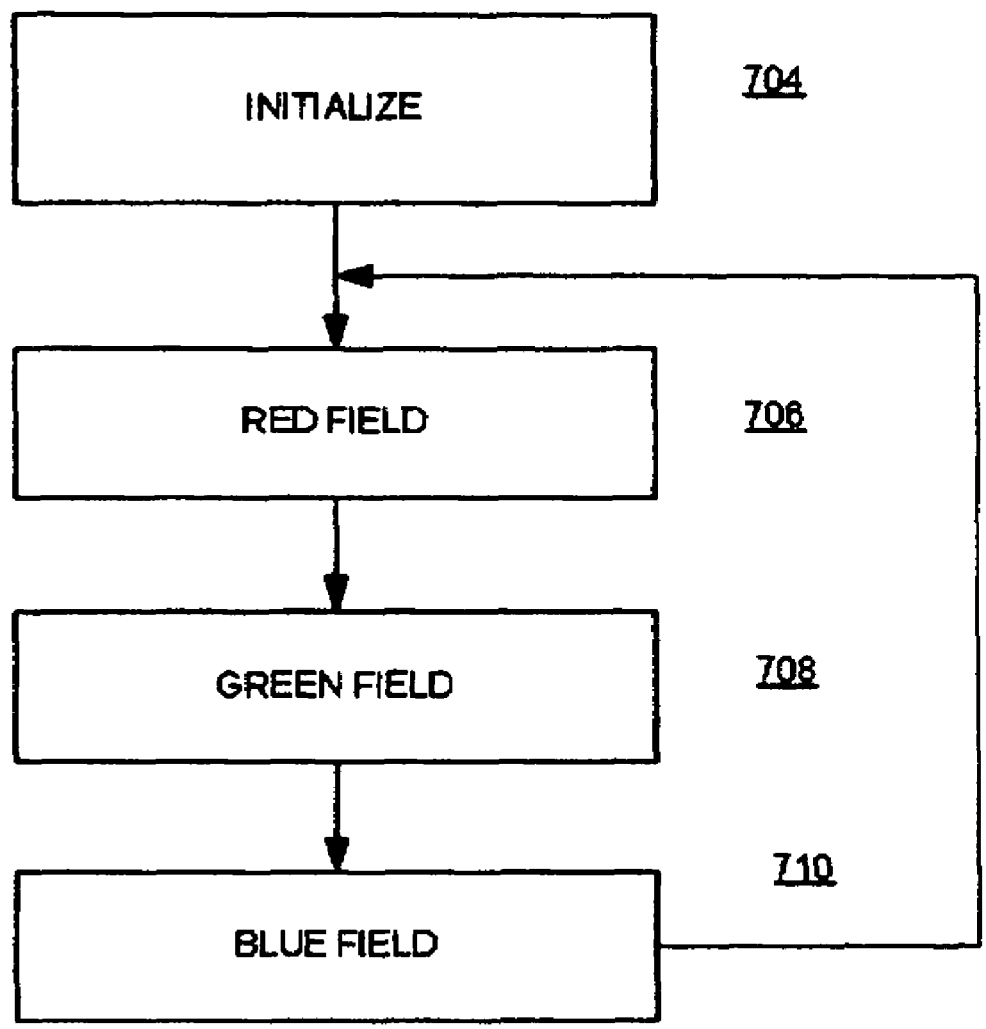
FIG. 7 illustrates a general overview of the method of illuminating an LCD.

FIG. 7 illustrates an overview of the embodiment of a method corresponding to the display scanning system. In the general method, initialization occurs 704 (e.g., registers are initialized) and the three colour fields are cycled through 706-710 through successive scans during a frame. Mono regions (i.e., regions only permitting a single ON colour and a different single OFF colour with no grey scale used) may be implemented.

Figure 8:
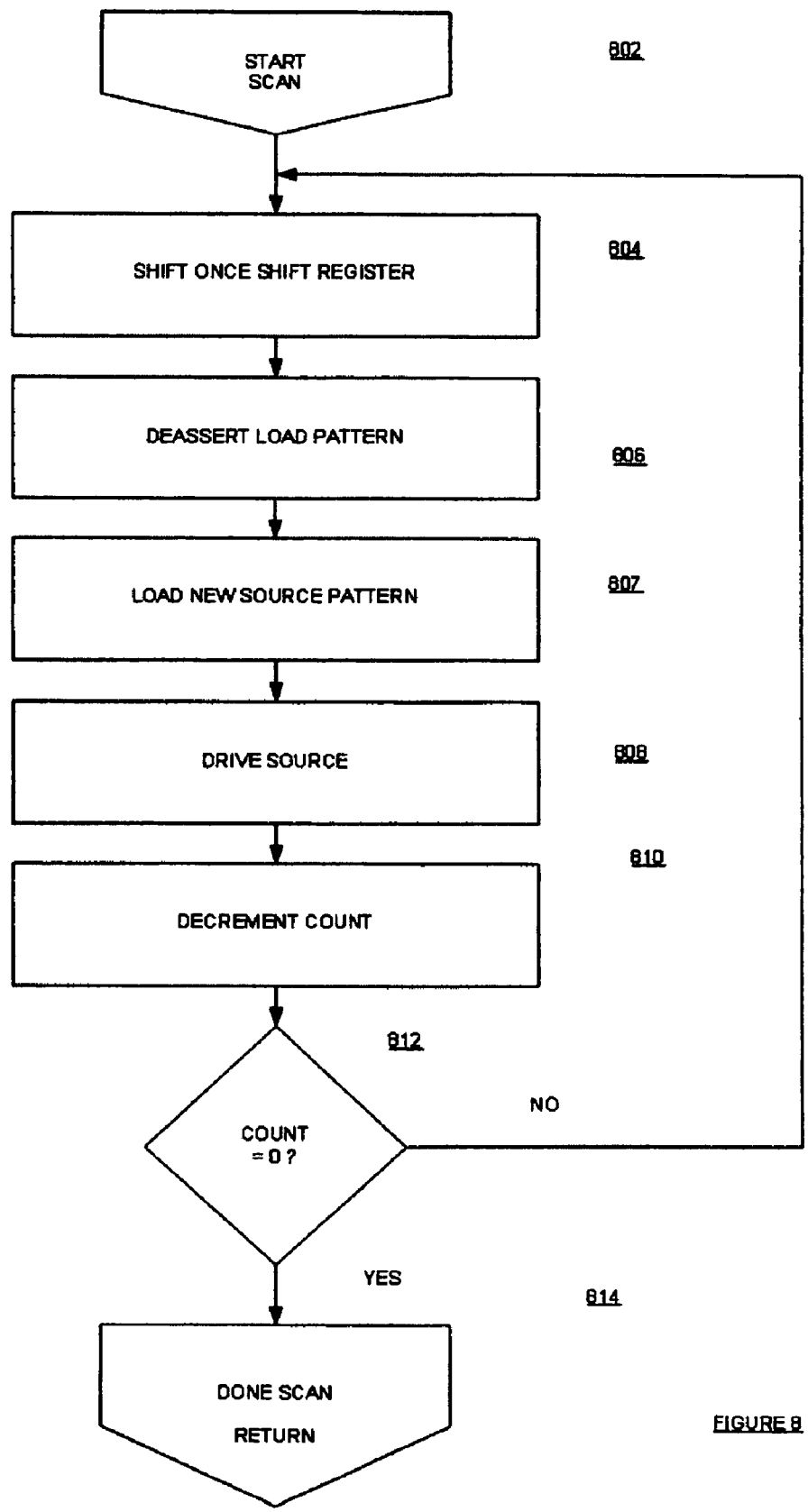
FIG. 8 illustrates further detail of an embodiment of the scanning for one colour within one frame.

FIG. 8 illustrates a more detailed embodiment of a scan for a field. The gate line driver is shifted once 804. The load pattern is deasserted 806. A new source pattern is loaded 807. The source lines on the display matrix are driven 808. The line count is reduced by one 810. As long as the counter does not expire (e.g., the line count remains greater than zero in a count down mode) 812, scanning resumes at step 804.

Figure 9:
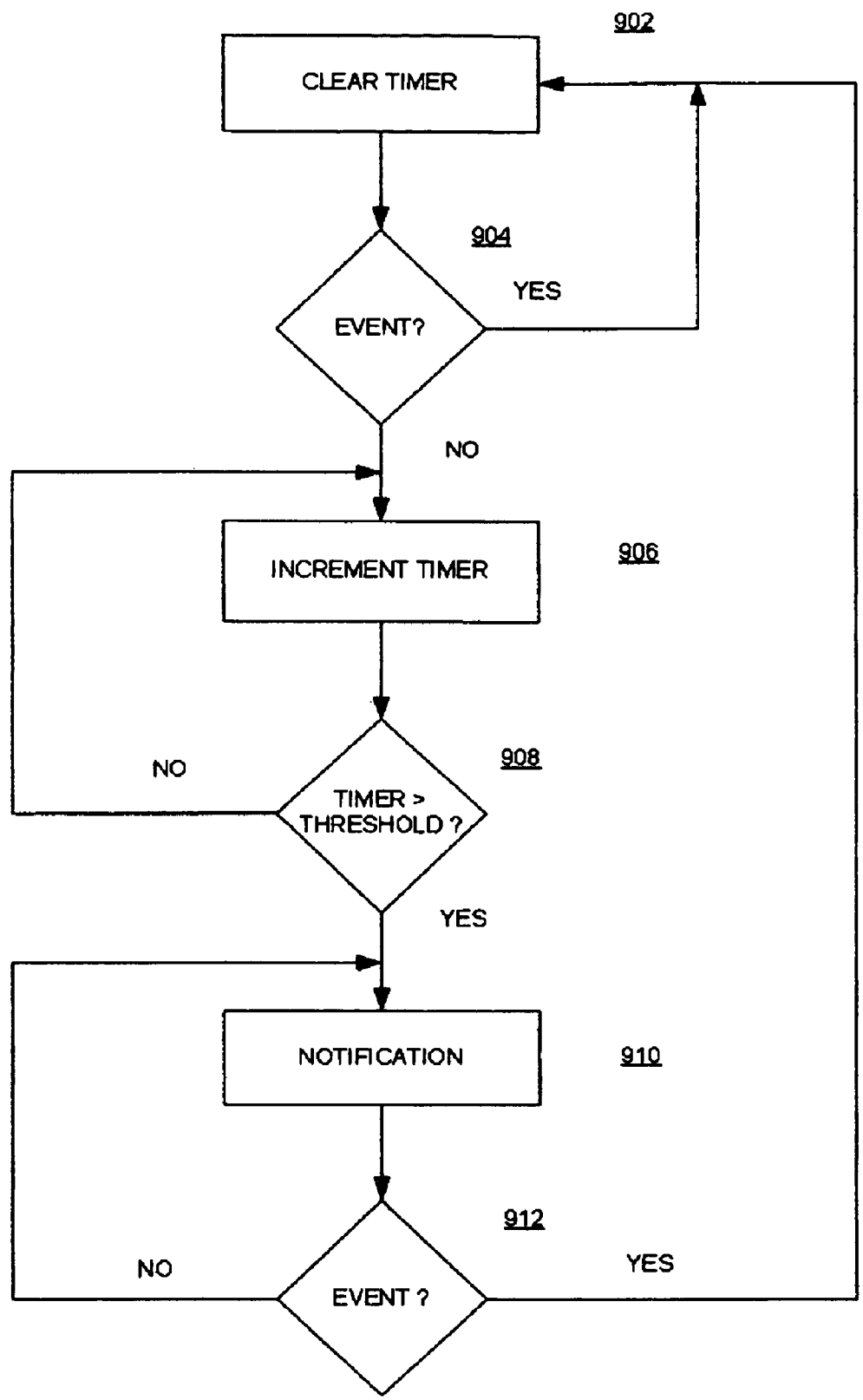
FIG. 9 illustrates an embodiment of a method for providing a notification of the present invention.

FIG. 9 illustrates an embodiment of a notification method. A notification timer is cleared 902. If a triggering event occurs 904, the notification timer is cleared again 902. The triggering event may be the pressing of a key, moving a thumb wheel, physically moving the device, and the like. If no triggering event occurs 904, the timer increments 906 the timer count value. If the timer count value exceeds a threshold 908, the device enters notification mode 910. In notification mode, a visual notification occurs to alert the user to the power on, inactive state of the device. In one embodiment, there is a light emitting diode (LED) notification "heartbeat" in which the notification LED flashes regularly or irregularly to indicate the device is still powered up. The LED colour for an inactive, powered on state may be selected to be different from an LED colour for a message notification. In another embodiment, part or all of the LCD backlight (e.g., one or more but less than all the LEDs of the backlight) may be used to provide a large visual area.

Figure 10:
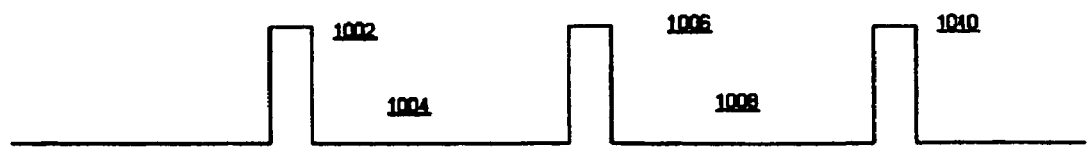
FIG. 10 illustrates a notification waveform with a notification signal at a regular interval.
Figure 11:
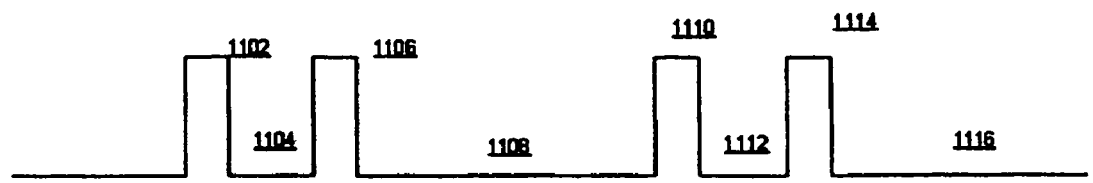
FIG. 11 illustrates a notification waveform with a non-uniform interval.
Figure 12:
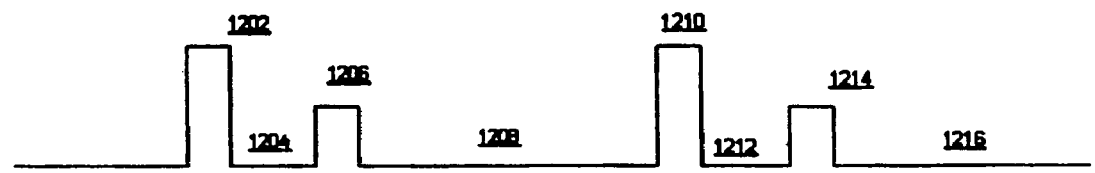
FIG. 12 illustrates another embodiment of a notification waveform with a non-uniform interval.
Figure 13:
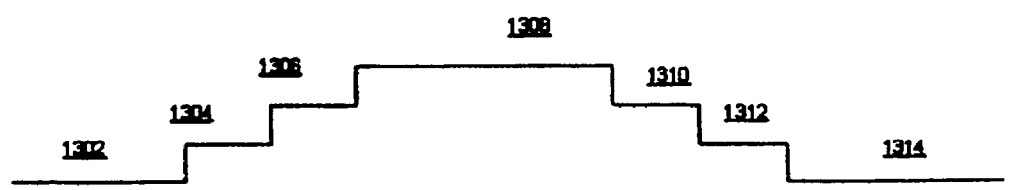
FIG. 13 illustrates a sinusoidal notification waveform.
Figure 14:
FIG. 14 illustrates a triangular waveform.

Various embodiments of the inactive, powered up state notification signal may be implemented. FIG. 10 shows a waveform 1002, 1006, 1010 that occurs at a uniform interval 1004, 1008. FIG. 11 shows a waveform 1102, 1106, 1110, 1114 that occurs at other than a uniform interval. A non-uniform interval may be irregular or vary between two or more fixed periods of time. LED brightness may be ramped up and ramped down to provide a type of "breathing" or "heartbeat" effect to make flashing less harsh—a benefit in dark or dimly lit conditions. The ramping effect may be creation through switching and voltage division circuitry. FIG. 12 shows a waveform 1202, 1206, 1210, 1214 that occurs more nearly as a heartbeat as found on a typical electrocardiogram. In FIG. 12, the first pulse 1202 is greater in amplitude than a companion second pulse 1206. The amplitude ratio between the first and second pulses 1202 and 1206 (or, 1210 and 1214) may be made adjustable and could range from 1:1 to 6:1. For example, the first pulse's amplitude might be twice or one and a half times that of the second pulse's amplitude. The first and second pulse may be joined without any interval between them. In an exemplary embodiment, the frame period may be 33.33 milliseconds in which the first and second pulses each last 0.65 milliseconds. FIG. 13 shows a sinusoidal waveform that permits a user to see a relatively gradual increase in intensity from OFF 1302 through steps 1304, 1306, and 1308, and a relatively gradual decrease through steps 1310, 1312, and 1314 to the OFF state 1316. FIG. 14 presents a triangular waveform 1404 between off states 1402 and 1406. Aside from sinusoidal and triangular waveforms, square waveforms and other waveforms may be used.

Notification may be provided within a variety of other ways. Since more than one colour of LCD backlight is available in field sequential type displays, the colour may be alternated. For example, the colour may flash red for a period of time, then switch to blue and back again. Or, two or more colours may be combined to provide blended colours such as yellow or orange. Graphics, such as "INACTIVE DEVICE" or "PLEASE POWER DOWN," may be used. Alternatively, a user may customize the display colour for this type of "heartbeat." This may be especially useful for those people who are more responsive to certain colours than to others; for example, a user with red-green colour blindness. Using only one LED at a time would save power and would also result in a lowered brightness level compared to normal use of the device because only one of the three colours would be used.

The interval settings and waveform shapes and behaviours may be set by a manufacturer and/or may be settable by a user to provide a customized inactive device notification display. Through menu selections, a user may be able to vary the inactive period length to delay or quicken the presentation of inactive device notification. A menu may permit blended colour selection according to saturation and hue and may permit a sequencing of different colours. Enhanced pulsation or blinking features may be used, including using all or a portion of the LCD screen as a blank screen that changes colour. The LCD screen may present blinking and/or animated graphics and/or text.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

We claim:

1. A method for indicating a powered state for a portable electronic device when a backlight function for a display is turned off, comprising:
    monitoring for a defined length of time of inactivity of said device; and
    upon exceeding said defined length of time of inactivity, entering an inactivity notification mode in which a visual notification is activated on said device indicating that said device is powered, but in a state of inactivity, said visual notification comprising a double pulse having a first pulse and a second pulse that occurs at a regular interval.

2. The method of claim 1, wherein light emitting diodes on said device provides said visual notification.

3. The method of claim 2, wherein said visual notification is provided by said light emitting diodes separate from a backlight function for said display.

4. The method of claim 2, wherein said visual notification is provided by said light emitting diodes selected from said backlight function for said display.

5. The method of claim 4, wherein visual notification comprises light with a colour selected from the group consisting of red, green, and blue.

6. The method of claim 4, wherein said visual indication comprises light with a blended colour that is a combination of two or more colours from the group consisting of red, green, and blue.

7. The method of claim 4, wherein said visual notification comprises at least one waveform selected from a square wave, a sinusoidal wave, a triangular wave, a periodic pulse and a non-periodic pulse.

8. The method of claim 4, wherein the first pulse and the second pulse have the same amplitude.

9. The method of claim 4, wherein the first pulse and the second pulse have different amplitudes.

10. The method of claim 9, wherein the amplitude of the first pulse is about twice as great as the amplitude of the second pulse.

11. The method of claim 9, wherein the first pulse and the second pulse represent a heart beat.

12. A portable electronic device, comprising:
    a display;
    a backlight for said display;
    a processor for controlling said display and said backlight;
    a keypad for providing input to the processor;
    an activation module to monitor for a defined length of time of inactivity of said device by monitoring at least activation of said keypad when said backlight is turned off; and
    a control module to generate a visual notification on said device though said backlight indicating that said device has been inactive but powered for at least said defined period of time, utilizing signals from said activation module,
    wherein said visual notification comprises a first pulse and a second pulse that occur at a regular interval.

13. The portable electronic device as claimed in claim 12, wherein said display is a field sequential liquid crystal display.

14. The portable electronic device as claimed in claim 13, wherein said backlight comprises red, green and blue light emitting diodes.

15. A portable electronic device, comprising:
    a display;
    a backlight for said display;
    a processor for controlling said display and said backlight;
    a keypad for providing input to the processor;
    an activation module to monitor for a defined length of time of inactivity of said device by monitoring at least activation of said keypad when said backlight is turned off;
    a control module to generate a visual notification on said device through that said device has been inactive but powered for at least said defined period of time, utilizing signals from said activation module; and
    a light source separate from said backlight to provide said visual notification.

16. The portable electronic device as claimed in claim 15, wherein said visual notification comprises a first pulse and a second pulse that occur at a regular interval.

17. The portable electronic device as claimed in claim 16, wherein the first pulse and the second pulse have the same amplitude.

18. The portable electronic device as claimed in claim 17, wherein the first pulse and the second pulse have different amplitudes.

19. The portable electronic device as claimed in claim 18, wherein the amplitude of the first pulse is about twice as great as the amplitude of the second pulse.

20. The portable electronic device as claimed in claim 19, wherein the first pulse and the second pulse represent a heart beat.

* * * * *